(12) United States Patent
Chen et al.

(10) Patent No.: US 9,547,378 B2
(45) Date of Patent: Jan. 17, 2017

(54) SENSOR ON SIDE OF COMPUTING DEVICE

(71) Applicant: Hewlett-Packard Development Company, L.P., Houston, TX (US)

(72) Inventors: Chun-Chieh Chen, Taipei (TW); James M. Mann, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 243 days.

(21) Appl. No.: 13/788,623

(22) Filed: Mar. 7, 2013

(65) Prior Publication Data

US 2014/0253439 A1    Sep. 11, 2014

(51) Int. Cl.
*G06F 3/033*    (2013.01)

(52) U.S. Cl.
CPC ...................... *G06F 3/033* (2013.01)

(58) Field of Classification Search
CPC ...... G06F 3/033; G06F 3/0383; G06F 3/0425; G06F 3/04883; G06F 1/1626
USPC .................................................. 345/156–179
See application file for complete search history.

(56) References Cited

U.S. PATENT DOCUMENTS

| | | | | |
|---|---|---|---|---|
| 2003/0128188 A1* | 7/2003 | Wilbrink | ............... | G06F 1/1626 345/158 |
| 2004/0263479 A1* | 12/2004 | Shkolnikov | ........... | G06F 1/1626 345/169 |
| 2009/0027330 A1* | 1/2009 | Aida | .................. | G06F 3/04883 345/156 |
| 2009/0284469 A1* | 11/2009 | Hsieh | ................... | G06F 1/1626 345/158 |
| 2010/0149124 A1 | 6/2010 | Kim et al. | | |
| 2012/0162077 A1* | 6/2012 | Sze | ....................... | G06F 3/0425 345/163 |
| 2013/0044257 A1* | 2/2013 | Chien | ................. | H04M 1/0264 348/373 |
| 2013/0057469 A1* | 3/2013 | Ajika | ..................... | G06F 3/017 345/156 |
| 2014/0168079 A1* | 6/2014 | Huang | ................. | G06F 3/0383 345/158 |

FOREIGN PATENT DOCUMENTS

JP    2010066971 A    *  3/2010

* cited by examiner

*Primary Examiner* — Amare Mengistu
*Assistant Examiner* — Jennifer Zubajlo
(74) *Attorney, Agent, or Firm* — HP Patent Department

(57) ABSTRACT

In one implementation, a housing has a first surface and a second surface. A first side may be between the first surface and the second surface. An input device on may be on the first surface. A sensor on the first side may generate data representing an object detected by the sensor. A controller may process the data and control movement of the cursor on a display when the controller determines that the object is in the shape of a hand in a grip form.

17 Claims, 9 Drawing Sheets

SENSOR ON SIDE OF COMPUTING DEVICE

BACKGROUND

Computing devices with graphical user interfaces can include pointing devices such as a mouse or a touchpad. The pointing device generates signals that cause a change to the graphical user interface. A mouse is an accessory that attaches to the computing device. A touchpad may be integrated into the computing device such as the palm rest of a notebook computer.

BRIEF DESCRIPTION OF THE DRAWINGS

Some example implementations of the invention are described with respect to the following figures.

DETAILED DESCRIPTION

Computer users may want the experience of using a mouse but may not want to carry a peripheral separate from the computing device. If a user could position their hand in a way emulating the placement of a hand on grip a mouse and the computer could interpret movement of the hand as movement of a mouse the user would not have to carry a mouse.

In one implementation, a housing has a first surface and a second surface. A first side can be between the first surface and the second surface. An input device can be on the first surface. A sensor on the first side can generate data representing an object detected by the sensor. A controller can process the data and control movement of the cursor on a display when the controller determines that the object is in the shape of a hand in a grip form.

In another implementation, a method of moving a cursor on a display of a computing device includes detecting an object with a sensor on a side of a housing. The side can be between a first surface including an input device and a second surface. A processor can determine if the object is the shape of a hand in a grip form. A cursor can be moved on a display relative to the movement of the of the hand.

In another implementation, a non-transitory computer readable medium includes code that if executed by a processor in a computing device causes the processor to determine from data received from a sensor on a side a computing device if a hand is present in a plane extending from a bottom of the computing device. The processor can determine if the hand moves from a first position in the plane to a second position in the plane. The processor can move a cursor on a display relative to the move of the hand from the first position to a second position.

Figure 1:
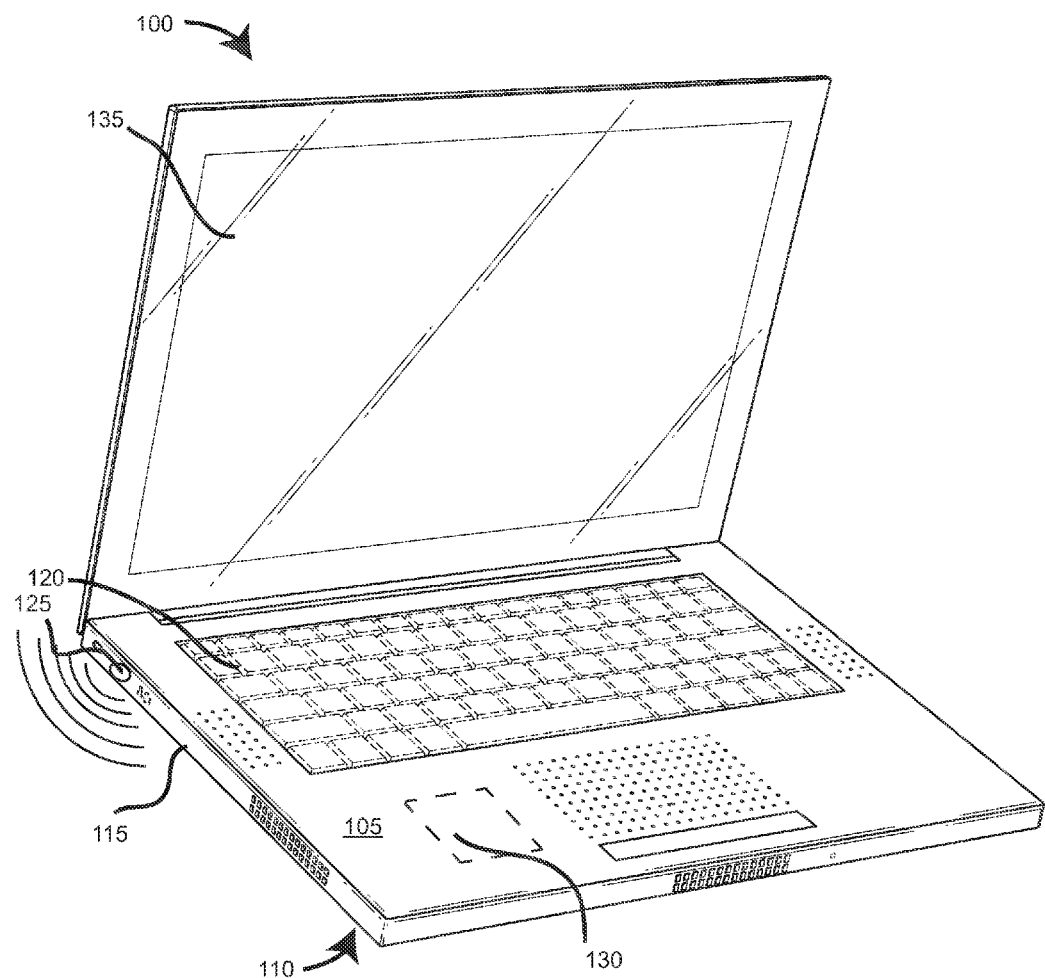
FIG. 1 is a computing device according to an example implementation.

With reference to the figures, FIG. 1 is a computing device according to an example implementation. The device 100 may be for example a notebook computer, a tablet computer, a phone, a personal digital assistant or another computing device. The device 100 can include a housing having a first surface 105 and a second surface 110. The first surface 105 may be the top of the base of a notebook computer. The second surface 110 may be the bottom of the base of a notebook computer. A first side 115 can be between the first surface 105 and the second surface 110. The first side 115 may be the front, left or right side or the back of the base of a notebook computer.

An input device 120 can be on the first surface. The input device 120 may be for example a keyboard, a touch screen or another input device. The keyboard may be a QWERTY keyboard or another type of keyboard.

A sensor 125 can be on the first side 115 to generate data representing an object detected by the sensor 125. The sensor 125 may be for example a time of flight 3D sensor, a structured light sensor, a sonar sensor or another type of 3D sensor.

For example the object may be a hand of a user. A controller 130 can process the data from the sensor 125. The controller 130 can be within the housing and is shown as a dotted line as it is not visible. The controller 130 may be for example a general purpose processor, an application specific integrated circuit (ASIC) or another type of controller. The controller 130 can control movement of the cursor on a display 135. The cursor may be any indicator on a computer screen identifying the point that will be affected by input from the user. The cursor may be for example a pointer or another form of a cursor. The controller 130 can determine if the object detected by the sensor 125 is a hand in a grip form. When the controller determines that the object is in the shape of a hand in a grip form movement of the hand causes data from the sensor to change and the controller 130 moves the cursor on the display 135 relative to the movement of the hand. For example if the hand is moved left the cursor moves left on the display, the movements of the cursor relative the movements of the hand in grip form would emulate the movements of a cursor relative to the movements of a physical mouse.

A user of a mouse may use for example a palm grip, a claw grip, or a finger grip, the grip puts the hand is a specific shape. The palm grip emulates the user placing his entire hand onto the top of the mouse, resting his palm and the pit of his hand on the rear of the mouse's shell. The claw grip emulates the user arching their fingers required to hold the mouse and press each mouse button. The finger grip emulates the user gripping the mouse solely with the tips of his fingers. The sensor 125 can detect the shape of the hand and generate the data based on the shape. The controller 130 can determine from the data if the hand is in the shape of a grip and move the cursor based on the hand movement without a mouse. If the object is not a hand or is a hand that is not in the shape of a grip the controller 130 may not move the cursor on the display 135. The grips may be preprogrammed in the device or the grips may be programmed by having the user make a grip in view of the sensor 125 and saving the data in the device. A user may rest the tips of their fingers on a surface such as a desk when the computing device is on the desk.

The grip form of the hand operates as a virtual mouse. A mouse may have at least one button. The user may select from different types of virtual mice, for example the user may have an option to have a single button mouse, a two, three, four or five button mouse. A mouse may have a scroll function such as a scroll wheel. A virtual mouse does not have buttons therefore movement of the fingers can be detected by the sensor and the data interpreted by the controller. For example if a user wants to left click a two button virtual mouse the user may raise their index finger from the surface and place the finger back on the surface. If the user wants to scroll through a document the user may for example user their index finger to over the tip of the finger in a rotation where the tip of the finger moves forward then raises, the moves back while raised and then lowers again to emulate moving a scroll wheel forward raising the finger from the scroll wheel and moving the finger to the other end of the scroll wheel.

The computing device may have a training mode to learn what each particular function of the virtual mouse looks like when performed by a particular user. For example the computing device may learn what a left click, right click, scroll up, and scroll down looks like when performed by a particular user. The user may also be able to learn the grip form of the hand that the computer device should recognize as a grip.

The computing device may also learn unconventional hand gestures for different functions. For example if a user does not have all five fingers the device may be able to interpret other movements as functions such as left or right click. These unconventional hand gestures may be learned by the device. For example a user without an index finger has probably been using a physical mouse and the computing device can learn the hand movement of the user that the user would perform with the physical mouse.

A sensor has to have the fingers of the user in the field of view of the sensor to be able to detect movement of the individual fingers. A device may have a back side that is further from a user using the computing device and a front side that is closest to the user. The first side may be between the front and the back. The sensor in the front side may be closer to the back of the first side than to the front of the first side and angled back toward the user so that the sensor has a view of the users fingers.

Figure 2:
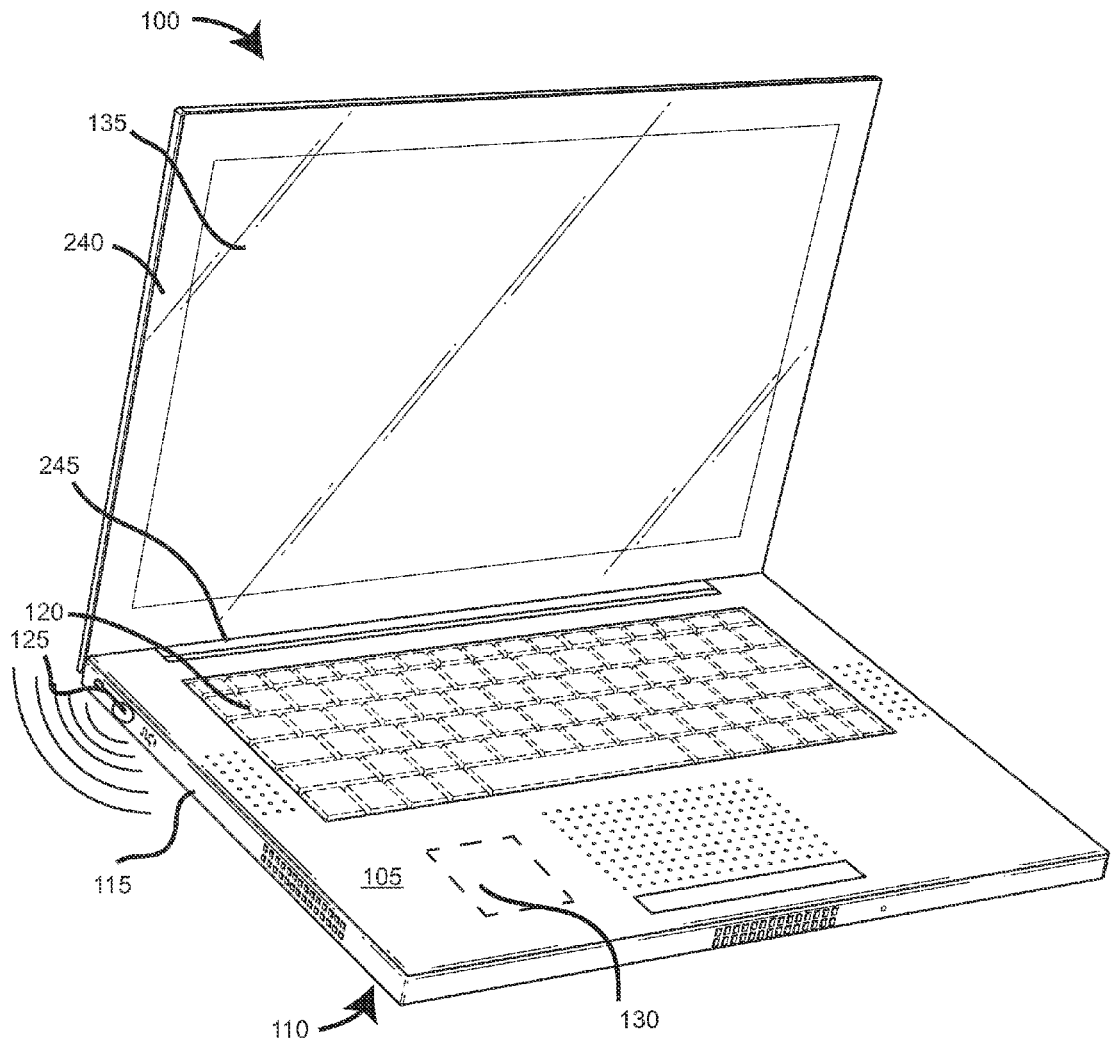
FIG. 2 is a computing device according to an example implementation.

FIG. 2 is a computing device according to an example implementation. The computing device may be a notebook computer with a second housing 240 having the display 135 and connected to the housing with a hinge 245. In some implementations the second housing 240 can be a tablet computer that is removably coupled to the housing. The input device 120 may be a keyboard, a touch sensor for a display or another input device. If the input device is a touch screen the touch screen may display a virtual keyboard.

Figure 3:
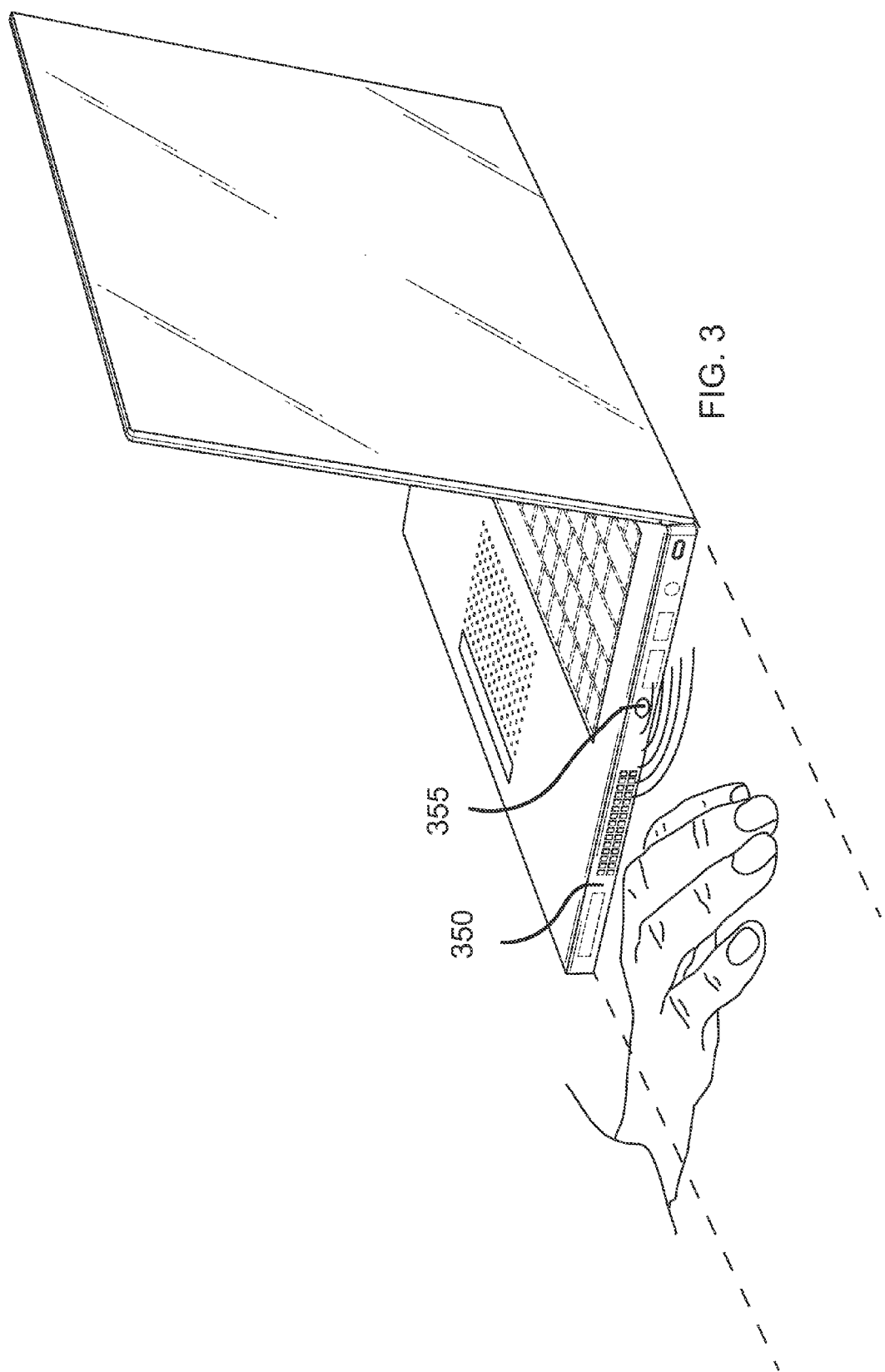
FIG. 3 is a computing device according to an example implementation.

FIG. 3 is a computing device according to an example implementation. The device can include a second side 350. The second side 350 may be opposite the first side. The second side 350 can include a second sensor 355 to generate data representing an object detected by the second sensor 355. In one implementation the controller may respond to the first sensor data, the second sensor data or both the first and second sensor data. The user may have the controller respond to data from a sensor that is on the same side of the computer as the user's dominate hand. For example if the user is right handed the user may have the controller respond to sensor data on the right side of the computing device and not data from a sensor on the left side of the computing device.

The dotted lines in FIG. 3 represent a plane extending from the computing device. In one implementation the computing device may move the cursor in response to the movement of a hand in grip form when the hand is in substantially the plane of the computing device. The plane may be for example a work surface such as a desk that is supporting the computing device and the work surface may also be supporting the hand.

Figure 4:
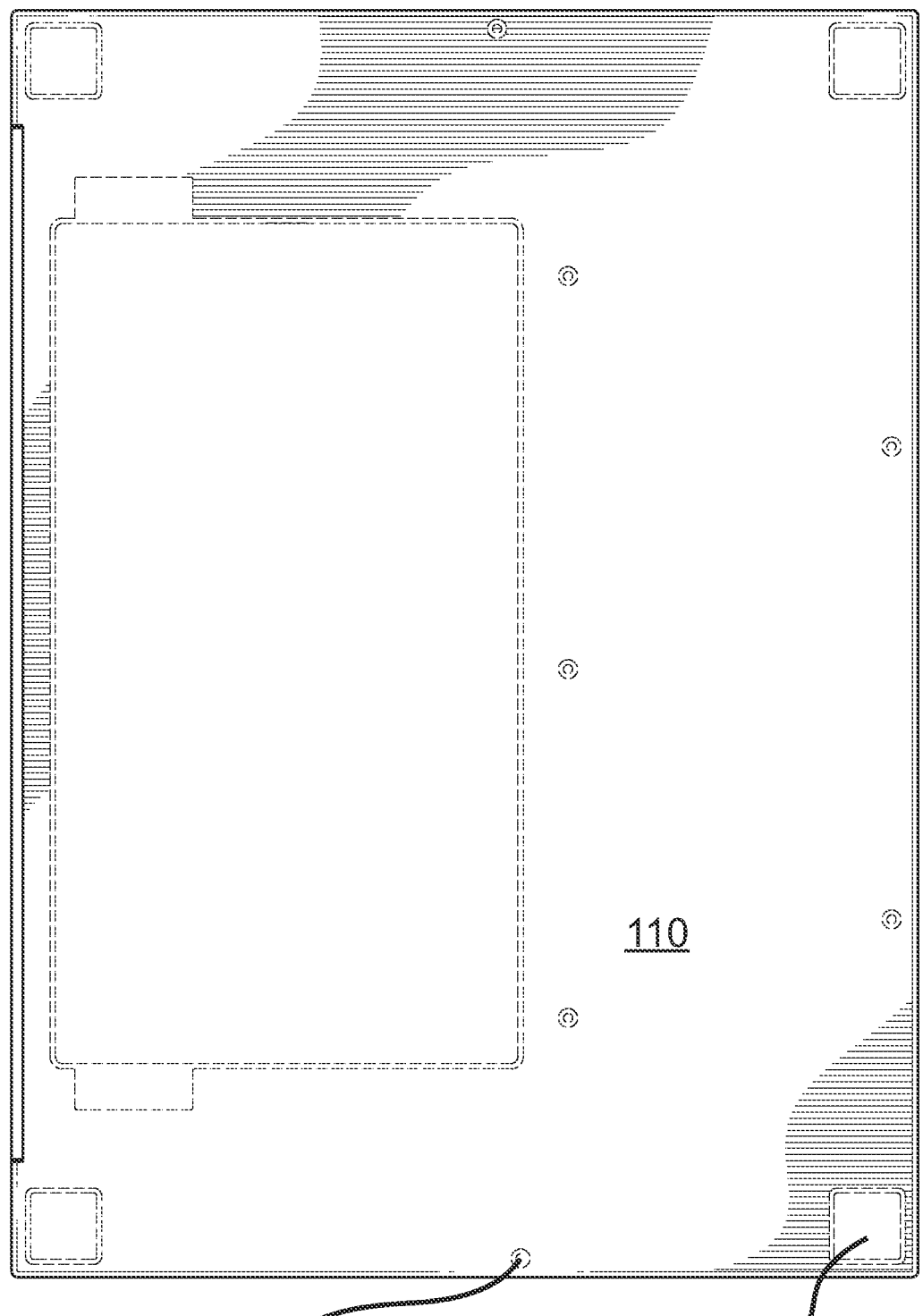
FIG. 4 is a computing device according to an example implementation.

FIG. 4 is a computing device according to an example implementation. The device can include a second surface 110. The second surface may for example include feet 460 attached to the second side 110 to support the housing on a surface. For example the feet 460 may support the housing on a desk, table, counter, or other surface which may be horizontal. The computing device may not move the cursor in response to the movement of the object if the object is not on the surface that supports the computing device. The device may include an activation sensor 465 to determine when the device is on a surface and activate the sensor to generate data on the object. The activation sensor may be for example a proximity sensor or a mechanical sensor. In an implementation that has an activation sensor that activates the sensor the sensor may not have to have a field of view that is below the second surface because the object would be on the same surface as the computing device. In one implementation the activation sensor is an orientation sensor to determine if the computing device second surface extends perpendicular to the force of gravity. The sensor can have a field of view that is parallel to one of the first surface and the second surface and the field of view extends from the first side of the computing device. The field of view may be for example 180 degrees of may be less than 180 degrees. If the computing device responds to movement in some orientations and not others the controller may be more accurate in interpreting movements of the hand as emulating mouse movements for example if the controller only moves the cursor in response to a computing device being on a work surface and the hand in grip form also being on the same work surface then the controller would not have to interpret data that showed movement of the hand not on the work surface.

In one implementation the sensor is removable. The sensor may be in a dongle that can be plugged into a USB (universal serial bus) port on the computing device. The dongle may be small enough that it remains plugged in at all times. The drivers for the sensor may allow the selection of the left or right side of the computing device. The sensor in the dangle maybe adjustable so that the field of view of the sensor can be adjusted for different locations of USB ports on different computing device.

Figure 5:
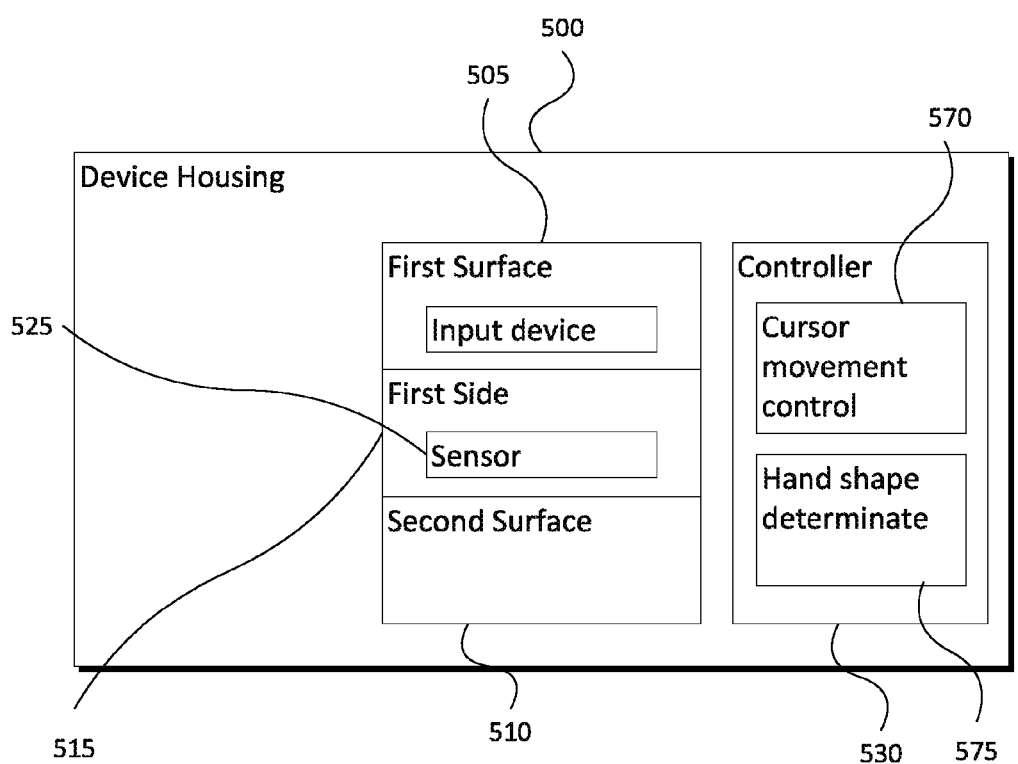
FIG. 5 is a block diagram of a computing device according to an example implementation.

FIG. 5 is a block diagram of a computing device according to an example implementation. The device 500 may be for example a notebook computer, a tablet computer, a phone, a personal digital assistant or another computing device. The device 500 can include a housing having a first surface 505 and a second surface 510. The first surface 505 may be the top of the base of a notebook computer. The second surface 510 may be the bottom of the base of a notebook computer. A first side 515 can be between the first surface 505 and the second surface 510. The first side 515 may be the front, left or right side or the back of the base of a notebook computer.

An input device can be on the first surface. The input device may be for example a keyboard, a touch screen or another input device. The keyboard may be a QWERTY keyboard or another type of keyboard.

A sensor 525 can be on the first side 515 to generate data representing an object detected by the sensor. The sensor 525 may be for example a time of flight 3D sensor, a structured light sensor, a sonar sensor or another type of 3D sensor.

For example the object may be a hand of a user. A controller 530 can process the data from the sensor 525. The controller 530 may be for example a general purpose processor, an application specific integrated circuit (ASIC) or another type of controller. The controller 530 can control movement of the cursor on a display. The cursor may be any indicator on a computer screen identifying the point that will be affected by input from the user. The cursor may be for example a pointer or another form of a cursor. The controller 530 can determine if the object detected by the sensor 525. When the controller determines that the object is in the shape of a hand in a grip form movement of the hand causes data from the sensor to change and the controller moves the cursor on the display relative to the movement of the hand. For example if the hand is moved left the cursor moves left on the display, the movements of the cursor relative the movements of the hand in grip form would emulate the movements of a cursor relative to the movements of a mouse.

A user of a mouse may use for example a palm grip, a claw grip, or a finger grip, the grip puts the hand is a specific shape. The palm grip emulates the user placing his entire hand onto the top of the mouse, resting his palm and the pit of his hand on the rear of the mouse's shell. The claw grip emulates the user arching their fingers required to hold the mouse and press each mouse button. The finger grip emulates the user gripping the mouse solely with the tips of his fingers. The sensor 525 can detect the shape of the hand and generate the data based on the shape. The controller 530 can include a hand shape determinate 575 module, the module may be instructions implemented in software or hardware. The hand shape determinate 575 module can determine from the data if the hand is in the shape of a grip and move the cursor based on the hand movement without a mouse. if the object is not a hand or is a hand that is not in the shape of a grip the controller may not move the cursor on the display. A user may rest the tips of their fingers on a surface such as a desk when the computing device is on the desk.

The cursor movement control 570 can be instructions implemented in software or hardware and may control how the cursor moves on the display in response to movement of the object. The grips may be preprogrammed in the device or the grips may be programmed by having the user make a grip in view of the sensor and saving the data in the device.

Figure 6:
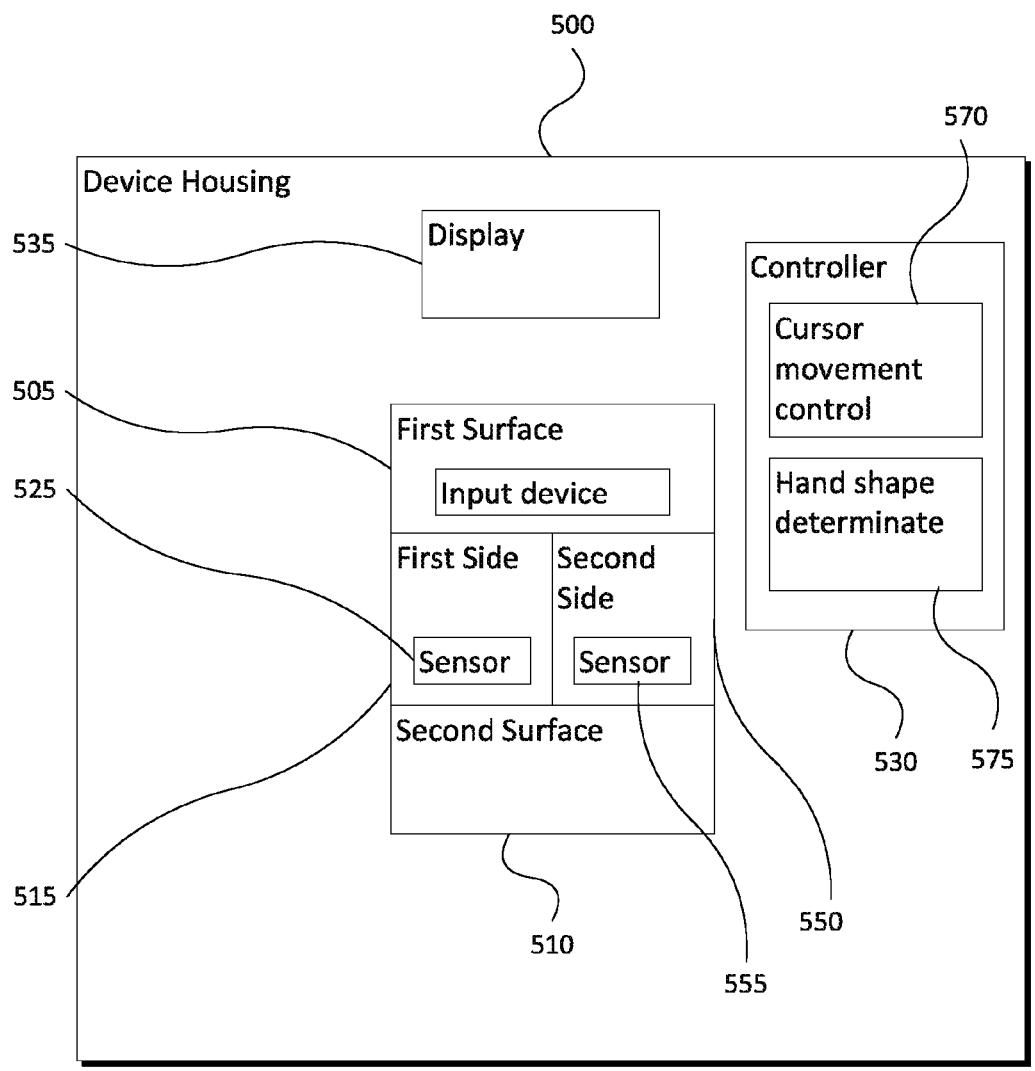
FIG. 6 is a block diagram of a computing device according to an example implementation.

FIG. 6 is a block diagram of a computing device according to an example implementation. The computing device can include a display 535. The device can include a second side 550. The second side may be opposite the first side. The second side 550 can include a second sensor 555 to generate data representing an object detected by the second sensor 555. In one implementation the controller may respond to the first sensor data, the second sensor data or both the first and second sensor data. The user may have the controller respond to data from a sensor that is on the same side of the computer as the user's dominate hand. For example if the user is right handed the user may have the controller respond to sensor data on the right side of the computing device and not data from a sensor on the left side of the computing device.

Figure 7:
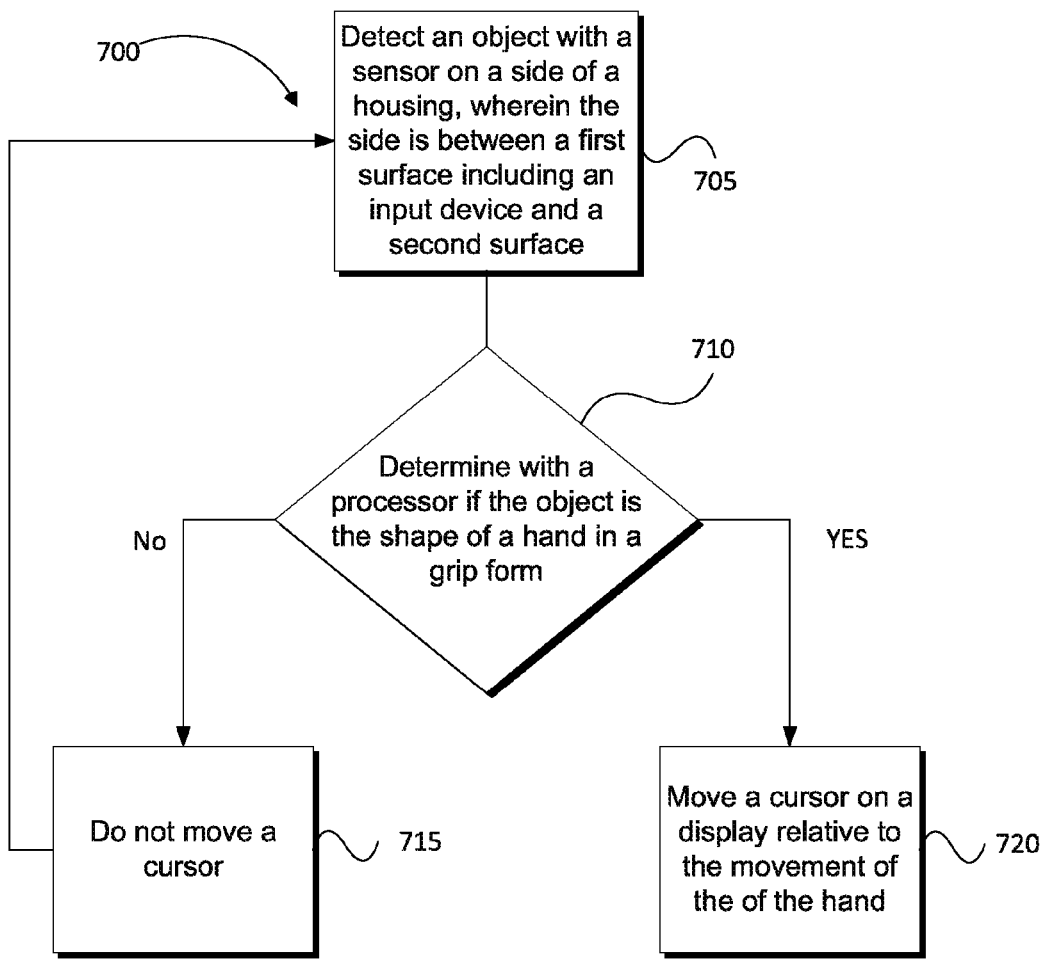
FIG. 7 is a flow diagram of a method of moving a cursor on a display of a computing device according to an example implementation.
Figure 8:
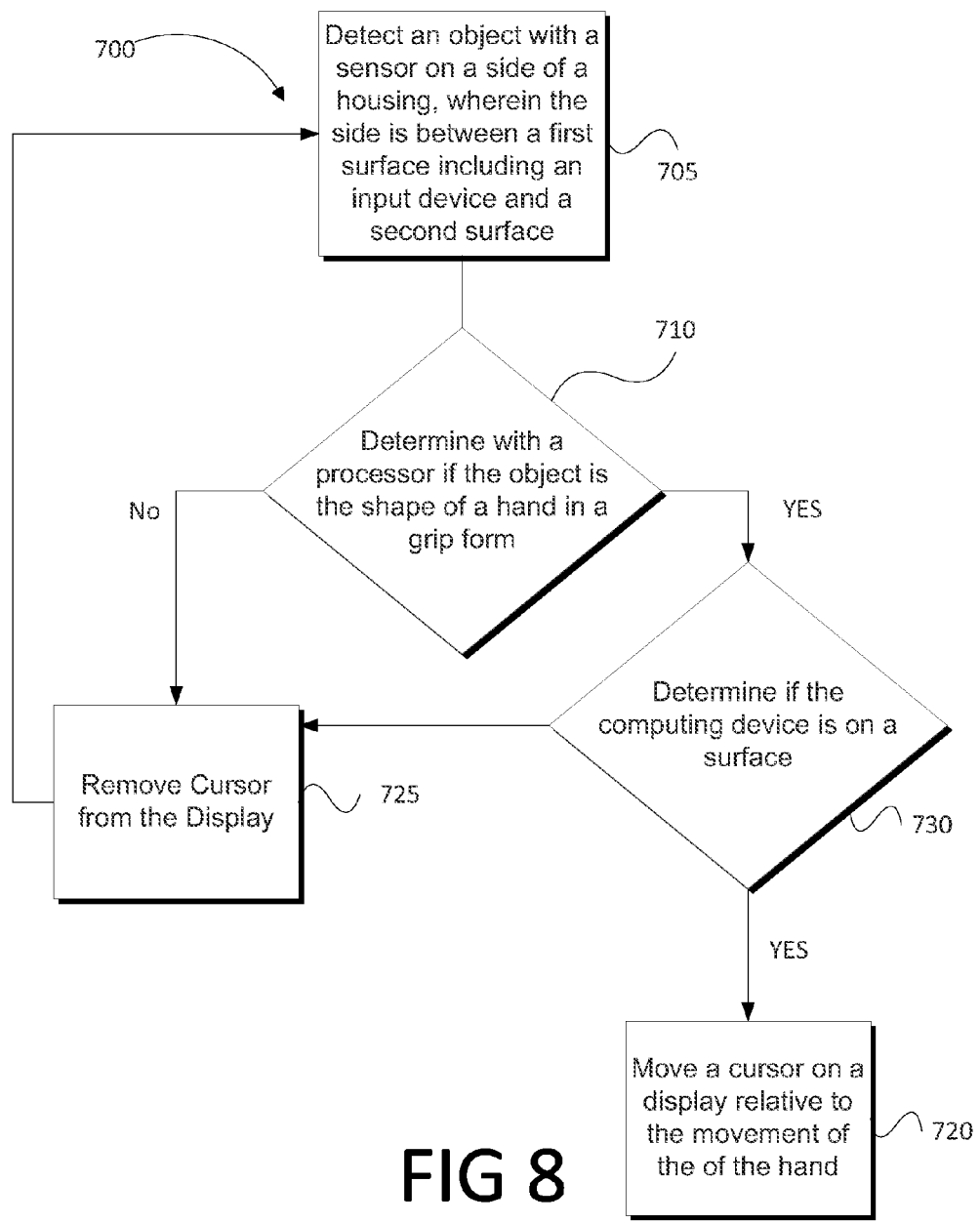
FIG. 8 is a flow diagram of a method of moving a cursor on a display of a computing device according to an example implementation.

FIG. 7 is a flow diagram of a method of moving a cursor on a display of a computing device according to an example implementation. The method 700 of moving a cursor on a display of a computing device can include detecting an object with a sensor on a side of a housing at 705. The side is between a first surface including an input device and a second surface. The input device may be a keyboard. A processor can determine if the object is the shape of a hand in a grip form at 710. If the hand is in the grip form the method goes to 720. A cursor on a display can be moved relative to the movement of the hand at 720.

If the hand is not in the grip form the method goes to 715. The cursor is not moved relative to the movement of the hand at 715. The method may continue by returning to 700.

Fig, 8 is a flow diagram of a method of moving a cursor on a display of a computing device according to an example implementation. The method 700 of moving a cursor on a display of a computing device can include detecting an object with a sensor on a side of a housing at 705. The side is between a first surface including an input device and a second surface. The input device may be a keyboard. A processor can determine if the object is the shape of a hand in a grip form at 710. If the hand is in the grip form the method goes to 730. It is determined if the computing device is on a surface at 730. If the computing device is on the surface the method proceeds to 720. A cursor on a display can be moved relative to the movement of the hand at 720.

If it is determined that the object is not in the shape of a hand in a grip from at 710 the method proceeds to 725. If the computing device is not on the surface the method proceeds to 725. The cursor can be removed from the display if the user's hand is not detected of if the computing device is not on the surface at 725.

Figure 9:
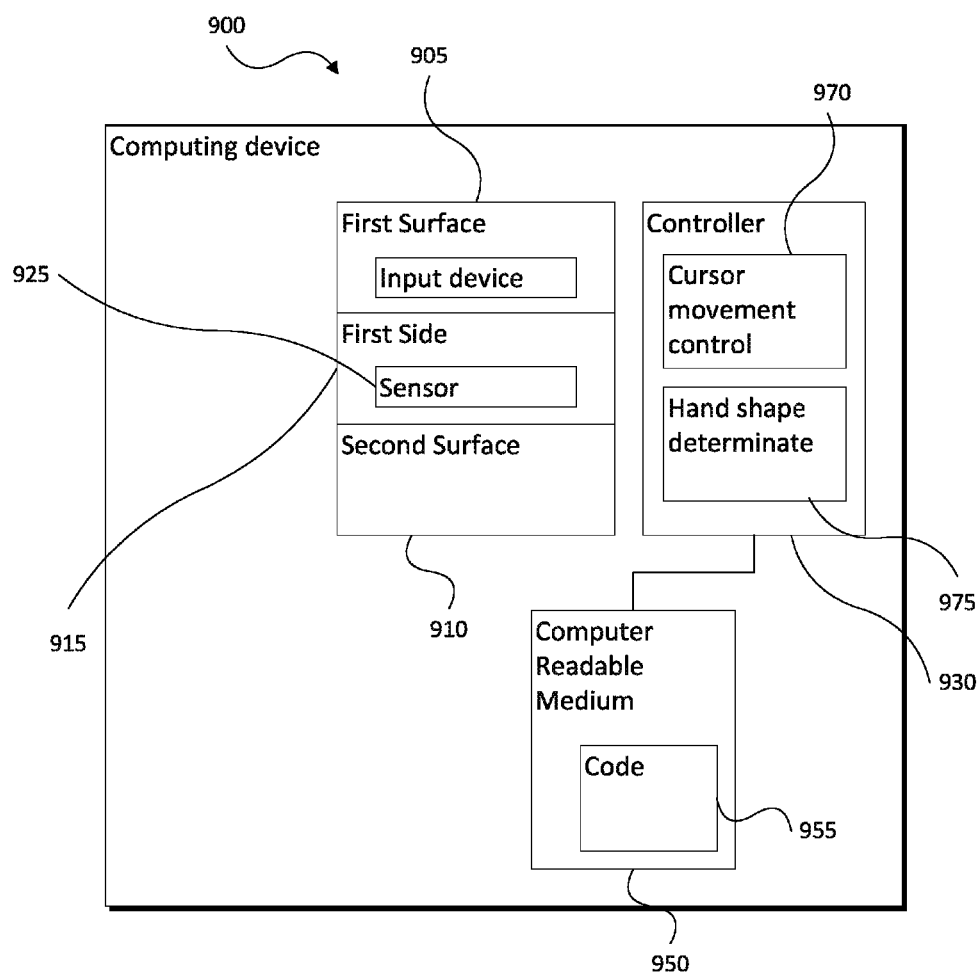
FIG. 9 is a computing system including a computer readable medium according to an example implementation.

FIG. 9 is a computing device including a computer readable medium according to an example implementation. A non-transitory computer readable medium 950 can include code that if executed by a processor 930 in a computing device 900 causes the processor to determine from data received from a sensor 925 on a side 915 a computing device if a hand is present in a plane extending from a bottom of the computing device. The processor 930 can determine if the hand moves from a first position in the plane to a second position in the plane and moves a cursor on a display relative to the movement of the hand from the first position to a second position.

The computer readable medium 950 may further include code that if executed causes a computing device to determine the orientation of the computing device from a sensor. The computing device may ignore the data depending on the orientation of the computing device. The processor may cause the cursor to be removed from the display if a hand is not present.

The techniques described above may be embodied in a computer-readable medium for configuring a computing system to execute the method. The computer readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

The terms "comprising," "having," and "including" are synonymous, unless the context dictates otherwise. In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A device comprising:
    a housing comprising:
        a first surface;
        a second surface; and
        a first side between the first surface and the second surface;
    an input device on the first surface;
    a processor disposed in the housing to receive data in response to user interaction with the input device;
    a first sensor to detect whether the housing is being supported by a supporting surface;
    a three-dimensional (3-D) sensor being disposed on the first side to acquire data representing an object;
    a controller to:
        determine whether the first sensor detects that the housing is being supported by the supporting surface;
        based at least in part on a result of the determination, selectively process the data to:
            determine whether the object is in the shape of a hand in a grip form;
            determine whether movement of the object is on the supporting surface; and
            based on the result of determining whether the object is in the shape of a hand in a grip form and the result of determining whether the movement of the object is on the supporting surface, selectively controlling movement of a cursor on a display.

2. The device of claim 1, further comprising a second housing having the display and connected to the housing with a hinge.

3. The device of claim 1, wherein the input device comprises a keyboard.

4. The device of claim 3, wherein the keyboard comprises a qwerty keyboard.

5. The device of claim 3, wherein the keyboard comprises a virtual keyboard.

6. The device of claim 1, wherein the input device comprises a touch sensor for the display.

7. The device of claim 1, wherein the 3-D sensor comprises a time of flight sensor or a structured light sensor.

8. The device of claim 1, further comprising a second side opposite the first side, wherein the second side includes another sensor to generate data representing an object detected by the another sensor, wherein the controller selectively processes the data generated by the another sensor based at least in part on data designating a dominant user hand.

9. The device of claim 1, further comprising feet attached to the second side to support the housing on the supporting surface.

10. The device of claim 1, wherein the first sensor comprises an orientation sensor or a proximity sensor.

11. The device of claim 1, wherein the 3-D sensor has a field of view that is parallel to one of the first surface and the second surface.

12. A method of moving a cursor on a display of a computing device comprising:
    detecting an object with a 3-dimensional (3-D) sensor on a side of a housing of a computing device, wherein the side is between a first surface including an input device and a second surface;
    determining with a second sensor and a processor disposed in the housing whether the computing device is being supported by a supporting surface; and
    based on a result of determining whether the computing device is being supported by the supporting surface, selectively processing data acquired by the 3-D sensor that is disposed on the side of the housing to determine whether the object is the shape of a hand in a grip form, determine whether movement of the object is on the supporting surface, and based on the result of determining whether the object is in the shape of a hand in a grip form and the result of determining whether the movement of the object is on the supporting surface, selectively controlling the movement of a cursor on a display of the computing device.

13. The method of claim 12, further comprising removing the cursor from the display if the user's hand is not detected.

14. A non-transitory computer readable medium comprising code that if executed by a processor in a computing device causes the processor to:
    detect an object with a 3-dimensional (3-D) sensor on a side of a housing of the computing device, wherein the side is between a first surface including an input device and a second surface;
    determine using a second sensor whether the computing device is being supported by a supporting surface; and
    based on a result of determining whether the computing device is being supported by the supporting surface, selectively process data acquired by the 3-D sensor that is disposed on the side of the housing to determine whether the object is the shape of a hand in a grip form, determine whether movement of the object is on the supporting surface, and based on the result of determining whether the object is in the shape of a hand in a grip form and the result of determining whether the movement of the object is on the supporting surface, selectively controlling the movement of a cursor on a display of the computing device.

15. The computer readable medium of claim 14 further comprising code that if executed causes a computing device to:
    determine the orientation of the computing device.

16. The computer readable medium of claim 15 further comprising code that if executed causes a computing device to:
    ignore the data depending on the orientation of the computing device.

17. The computer readable medium of claim 14 further comprising code that if executed causes a computing device to:
    remove the cursor from the display if a hand is not present.

* * * * *

UNITED STATES PATENT AND TRADEMARK OFFICE
CERTIFICATE OF CORRECTION

PATENT NO. : 9,547,378 B2  Page 1 of 1
APPLICATION NO. : 13/788623
DATED : January 17, 2017
INVENTOR(S) : Chen et al.

It is certified that error appears in the above-identified patent and that said Letters Patent is hereby corrected as shown below:

In the Drawings

Drawing sheet 7 of 9, reference numeral 720, Lines 3-4, delete "of the of the" and insert -- of the --, therefor.

Drawing sheet 8 of 9, reference numeral 720, Lines 3-4, delete "of the of the" and insert -- of the --, therefor.

Signed and Sealed this
Twenty-fifth Day of April, 2017

Michelle K. Lee
*Director of the United States Patent and Trademark Office*